United States Patent [19]

Beckmann

[11] 4,354,438
[45] Oct. 19, 1982

[54] METHOD AND APPARATUS FOR COOLING HOT BULK MATERIAL

[75] Inventor: Georg Beckmann, Vienna, Austria

[73] Assignee: Waagner-Biro A.G., Austria

[21] Appl. No.: 241,382

[22] Filed: Mar. 6, 1981

[30] Foreign Application Priority Data

Mar. 12, 1980 [AT] Austria .................................. 1351/80

[51] Int. Cl.³ .............................................. F23B 7/00
[52] U.S. Cl. ............................... 110/234; 110/165 R;
110/171; 110/341; 202/228
[58] Field of Search .................... 110/165 R, 171, 259,
110/234, 266, 341; 126/242; 202/228; 122/7 R

[56] References Cited

U.S. PATENT DOCUMENTS

| 1,624,661 | 4/1927 | Foresman | 110/171 X |
| 1,809,501 | 6/1931 | Allen | 110/171 |
| 1,843,274 | 2/1932 | Foresman | 110/171 |
| 4,264,415 | 4/1981 | Galow et al. | 202/228 |
| 4,284,477 | 8/1981 | Mansfield | 202/228 X |

*Primary Examiner*—Edward G. Favors
*Attorney, Agent, or Firm*—Steinberg & Raskin

[57] ABSTRACT

A method and apparatus for cooling hot bulk material, such as glowing coke, clinker, or sinter material, include a vertically oriented cooling tank into which the hot bulk material is introduced and in which the material flows downwardly under gravity and is discharged from an outlet. At least two partial currents of cooling gas are fed into the cooling tank at respective feeding points therein, the feeding point being respectively arranged one over the other so that the cooling gas fed into the tank flows upwardly around the bulk material as the latter flows downwardly to cool the same with the cooling gas being correspondingly heated. According to the invention, the cooling gas partial current fed into the cooling tank at a lower feeding point is at a lower temperature than the cooling gas partial current fed into the cooling tank at a feeding point which is arranged above the lower feeding point whereby the heat recovered is increased and the bulk material cooled to lower temperatures than has been possible heretofore.

16 Claims, 4 Drawing Figures

METHOD AND APPARATUS FOR COOLING HOT BULK MATERIAL

BACKGROUND OF THE INVENTION

This invention relates to methods and apparatus for cooling hot bulk material, such as glowing coke, clinker or sinter material and, more particularly, to such methods and apparatus for cooling hot bulk material which utilize a cooling gas fed into a cooling tank at at least two feeding points arranged over each other, i.e., in the direction of flow of the bulk material, whereby the cooling gas flows upwardly in the tank around the bulk material as the latter flows downwardly to cool the same.

Methods and apparatus are known for cooling hot bulk material in a cooling tank through the use of a cooling gas which is introduced into the bulk material at several points by a gas distributor. In such known methods and apparatus, the cooling gas is collected after it has been heated whereupon it is fed to a heat recovery plant.

Conventional arrangements of the type described above the not entirely satisfactory in that the bulk material is not cooled to a sufficient extent, i.e., still has a relatively high temperature after the cooling operation. This of course is disadvantageous since the conveyer apparatus which transports the bulk material after the cooling operation can be damaged by the relatively high temperatures thereof. Of course, recovery of the heat of the hot bulk material is quite inefficient.

In order to overcome the disadvantages discussed above, it has been suggested to utilize special cooling devices which reduce the temperature of the cooling gas to even lower levels. However, this is not entirely satisfactory in that such special devices are expensive in both cost and operation.

SUMMARY OF THE INVENTION

Accordingly, one object of the present invention is to provide new and improved methods and apparatus for cooling hot bulk material to lower temperatures than has been possible heretofore.

Another object of the present invention is to provide new and improved methods for cooling hot bulk material wherein the heat recovered therefrom is significantly increased.

Briefly, these and other objects are attained by providing a method and apparatus whereby the cooling gas is controllably heated and divided into partial currents which are fed into the bulk material at respective feeding points which are superposed with respect to each other in a manner such that the temperature difference between the bulk material and the cooling gas is maintained substantially constant so that the maximum temperature of the cooling gas is reduced.

By utilizing this technique, amount of heat supplied by the bulk material can be adapted to the quantity of heat consumed by the heat recovery plant with provisions being made, if desired, for the heat of a portion of the hot cooling gas to be utilized by other than the heat recovery plant. For example, a portion of the heated cooling gas can be directed over a intermediate heat carrier so that a coal dryer can be included in the arrangement such as in a dry coke cooling plant. In this connection, an important advantage obtained by the present invention when applied in connection with a dry coke cooling operation is that formation of hot nests in the cooled coke current is prevented through improved distribution of the cooling gas in the bulk material.

According to the invention, hot bulk material is introduced through an inlet into a vertically oriented cooling tank wherein it flows downwardly under gravity and is discharged from an outlet of the cooling tank. At least two partial currents of cooling gas are fed into the cooling tank at respective feeding points therein, which feeding points are respectively arranged one over the other so that the cooling gas flows upwardly in the tank around the bulk material as the latter flows downwardly to cool the same with the cooling gas being simultaneously heated.

An essential feature of the method of the present invention is that the cooling gas partial gas partial current which is fed into the cooling tank at a lower feeding point is maintained at a lower temperature than the cooling gas partial current which is fed into the cooling tank at a feeding point which is arranged above the lower feeding point. The apparatus of the invention includes the feature wherein several superposed gas feed means are arranged over each other in the cooling tank for feeding respective partial currents of recooled cooling gas into the cooling tank for cooling the bulk material. The heated cooling gas is discharged from the cooling tank through gas discharge means which are arranged proximate to the upper inlet through which the bulk material is charged into the cooling tank.

A hot gas dust arrester preferably communicates with the heated cooling gas discharge means so that the cooling gas is directed thereover and then into a heat recovery plant. Separate gas flow channels communicate with respective ones of the gas feed means, respective partial currents of the cooling gas being directed through the gas flow channels into gas feed means.

According to the method and apparatus of the present invention, improved distribution of the cooling gas throughout the bulk material in the cooling tank is achieved as well as a reduction in the temperature peaks of the heated cooling gas,

DESCRIPTION OF THE DRAWINGS

A more complete appreciation of the present invention and many of the attendant advantages thereof will be readily appreciated as the becomes better understood by reference to the following detailed description when considered in connection with the accompanying drawings in which.

DESCRIPTION OF THE PREFERRED EMBODIMENTS

Figure 1:
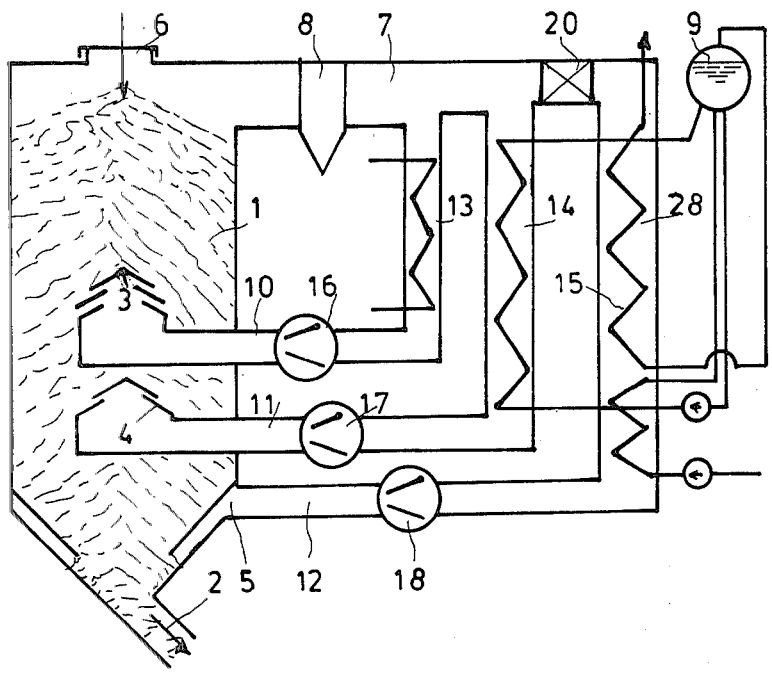
FIG. 1 is a schematic illustration of apparatus according to the present invention on illustrating the method thereof.

Referring now to the drawings wherein like reference characters designate identical or corresponding parts throughout the several views, and in particular to FIG. 1, the present invention is illustrated in connection with a method and apparatus for cooling hot glowing coke. A vertically oriented cooling tank or bin 1 has an inlet 6 at its upper end through which the hot coke is charged into the cooling tank and an outlet 2 at the lower end of the tank through which the cooled coke is discharged from the tank.

Cooling gas is fed into the hot coke tank through three gas feed devices 3, 4 and 4. The gas feed devices are located at respective feeding points which are respectively arranged one over the other so that the cooling gas flows upwardly in the tank 1 around the coke as the latter flows downwardly. In this manner, the hot coke is cooled while the cooling gas is heated.

The heated cooling gas fed into the hot bulk material through gas feed devices 3, 4 and 5 is discharged from the cooling tank 1 through hot gas line 7 which communicates with the cooling tank at a location proximate to the bulk material inlet 6. As seen in FIG. 1, the heated cooling gas is directed through the hot gas line 7 and fed over a hot gas dust arrester 8 whereupon the heated cooling gas is divided into the three partial currents, each of which flows through a separate respective gas flow channel which communicates with a respective one of the gas feed devices 3, 4 and 5.

A heat recovery plant, designated 9, which generally comprises a steam generating plant, includes at least one fluid circuit and associated heat transfer surfaces. According to the embodiment of the invention illustrated in FIG. 1, the heat transfer surfaces 13, 14 and 15 are each situated in one of the gas flow channels through which a respective partial current of cooling gas flows.

According to the invention, each of the heat transfer surfaces 13, 14 and 15 has a different heat consumption than the others so that each of the cooling gas partial currents are recooled to a different temperature. In the illustrated embodiment, the cooling gas partial current flowing over heat transfer surface 15 is cooled to the lowest temperature, the cooling gas partial current flowing over heat transfer surface 14 is cooled to the next lower temperature and the cooling gas partial current flowing over heat transfer surface 13 cooled to a somewhat higher temperature than the others. The recooled cooling gas partial currents which flow over the heat transfer surfaces 13, 14 and 15 are directed into the gas feed devices 3, 4 and 5 through the gas flow channels 10, 11 and 12, respectively.

In order to control the respective amounts of cooling gas in each partial current, circulating blowers 16, 17 and 18 are provided in the gas flow channels 10, 11 and 12.

Figure 2:
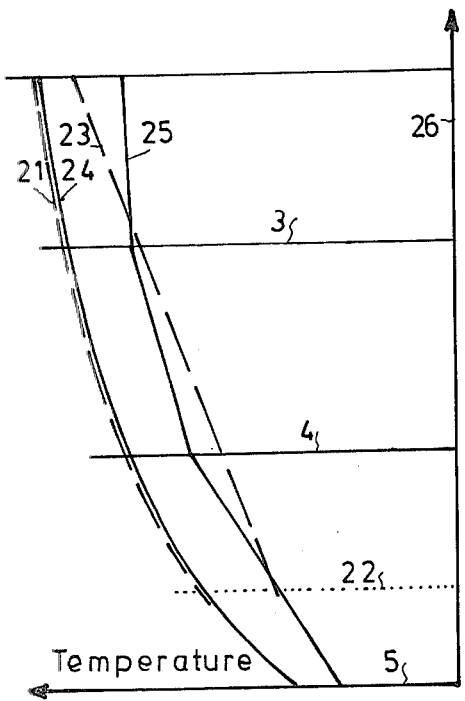
FIG. 2 is a graphical illustration showing the temperature variations of the bulk material and cooling gas through out the height of the cooling tank in conventional arrangements and in the present invention.

The operation of blowers 16, 17 and 18 are suitably adusted such that the cooling gas fed into the cooling tank at a lower feeding point or points is heated as it flows upwardly in the cooling tank to a particular feeding point which is arranged to the temperature of the cooling gas partial current which is fed into the cooling tank at that particular feeding point. For example, The temperature of the cooling gas fed into the cooling tank by gas feed device 5 increases as it moves upwardly in tank 1 and attains a temperature at the level of gas feed device 4 which substantially corresponds to the temperature of the cooling gas which is being fed into the cooling tank through gas feed device 4. This operation is best seen in FIG. 2, discussed below. In this manner, mixing losses which would otherwise occur in cooling tank 1 are significantly reduced.

It should be understood that within the scope of the present invention, one of the heat transfer surfaces, e.g., heat transfer surface 13 can be utilized in association with a heat consuming device which is separate from the steam generator of the heat recovery plant 9.

One of the heat transfer surfaces of the stream generator plant 9 may comprise a superheater heating surface. In order to protect such superheater heating surface 15 against heat peaks in the heated cooling gas, a heat accumulator 20 is preferably provided in the gas flow channel before the same in the direction of flow of the heated cooling gas in order to moderate the temperature of the cooling gas being directed thereover. Of course, other devices can be utilized to moderate the temperature of the heated cooling gas such, for example , as an adjustable cooling device.

Referring now to FIG. 2, a graphical depiction of the temperature variations of the bulk material and cooling gas are illustrated for both conventional arrangements and for the method and apparatus of the present invention. The line 26 represents the height of the cooling tank while line 5 indicates increasing temperature towards the left-hand direction as well as the bottom or discharge end of tank 1. The feeding points of the partial currents of the recooled heating gas are designated by horizontal lines 3, 4 and 5.

The broken line 21 represents the temperature variation of the glowing coke through its downward path through the cooling tank of a conventional arrangement. Broken line 23 represents the temperature variation of cooling gas in a conventional arrangement, the feeding point of which is indicated by the dotted line 22.

By splitting the cooling gas current into separate partial currents as described above, the temperature variation of the cooling hot bulk material can be maintained substantially the same as in the conventional arrangement as indicated by the solid curve 24 which is illustrated as substantially coinciding with the broken line 21 with the exception of the lower end thereof. The cooling gas is heated according to the present invention as indicated by the solid line 25. The change in slope of line 25 occurs at heating points 3 and 4 and results from the different quantities of the cooling gas partial currents fed into the cooling tank at the respective feeding points. As noted above, it is seen that the temperature of the cooling gas partial current fed into the cooling tank at feeding point 5 increases until it substantially corresponds to the temperature of the heating gas partial current introduced into the cooling tank at feeding point 4 and this cooling gas continuous to be heated and reaches a temperature which substantially corresponds to the temperature of the cooling gas partial current introduced into the cooling tank at feeding point 3.

An indication of the amount of heat recovered is obtained by considering the leg on line 26 which also indicates the respective height of the bulk material above the bottom feeding point of the cooling gas. The additional heat recovered according to the present invention is indicated by the portion of line 25 extending below the dotted line 22.

Figure 3:
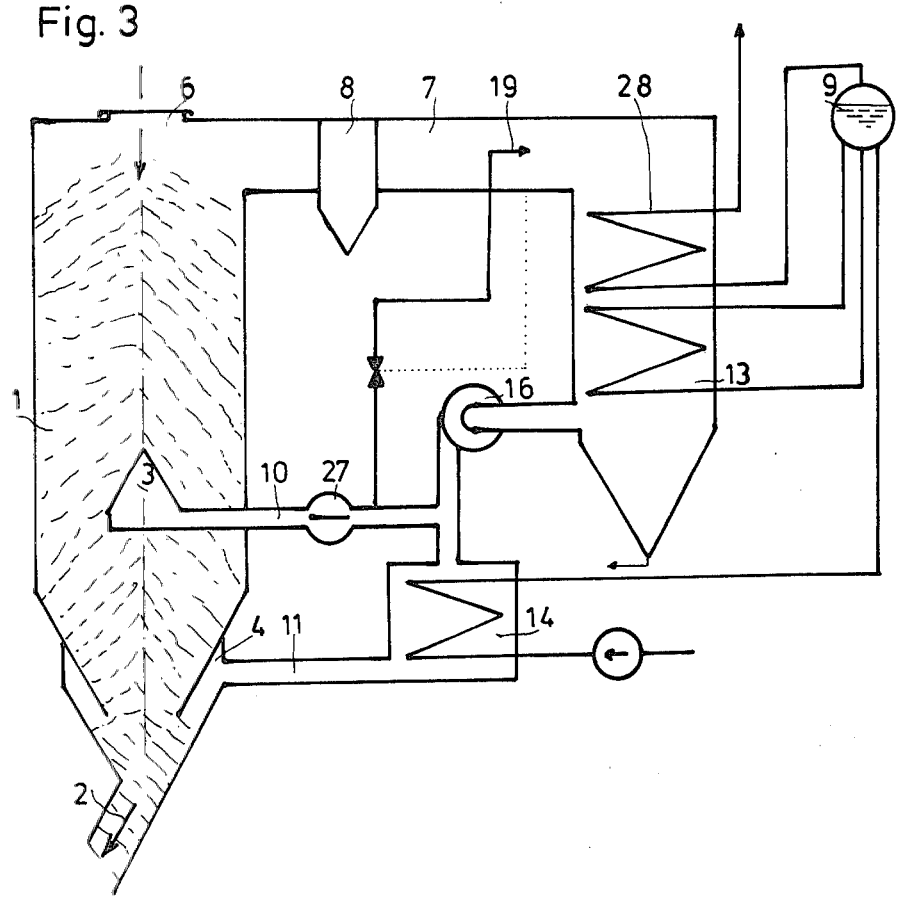
FIG. 3 is a schematic illustration of another embodiment of the present invention.

Referring now to FIG. 3, a schematic illustration of another embodiment of apparatus according to the present invention is shown. In this embodiment, only two feeding points 3 and 4 are provided within the cooling tank. The heated cooling gas is collected and split into two partial currents. After the partial currents are cooled by heat transfer surfaces 28 and 14 of heat recovery plant 9, the cooling gas partial currents are fed through gas flow channels 10 and 11 into respective gas feed devices 3 and 4.

It is noted that in the embodiment illustrated in FIG. 3, the two gas flow channels 10 and 11 have only a single blower 16 which is common to both. A restrictor 27 is provided in the gas flow channel 10 so that a control of the amount of recooled cooling gas can be obtained similar to that obtained in the embodiment of FIG. 1.

It is seen in the embodiment of FIG. 3 that all of the heated cooling gas is fed over the heat transfer surfaces 28 and 13 which are connected in series with each other whereupon the cooling gas is split into two partial currents, one of which is then directed over additional heat transfer surface 14 arranged in parallel with respect to heat transfer surfaces 13 and 28. In this manner, the cooling gas partial current flowing through the gas flow channel 11 is maintained at a lower temperature than that flowing through the gas flow channel 10.

In order to protect the superheater heating surface 28 of heat recovery plant 9, an adjustable cooling gas return circuit 19 is provided through which cooled cooling gas can be bled from the gas flow channel 10 and introduced into the heated cooling gas channel 7 to adjust the temperature thereof.

Figure 4:
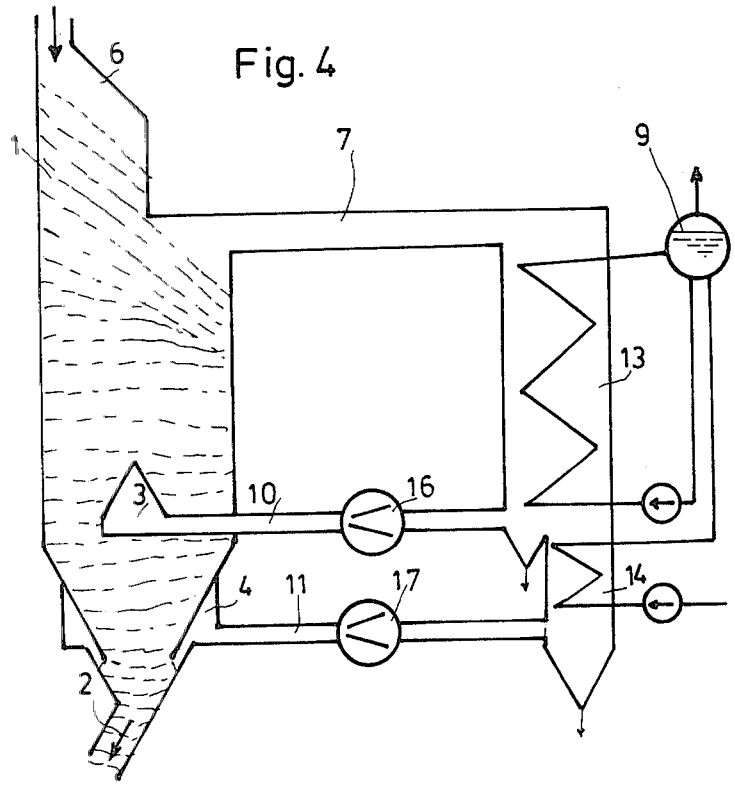
FIG. 4 is a schematic illustration of yet another embodiment of the present invention.

FIG. 4 illustrates another embodiment of the apparatus according to the present invention. In this embodiment, the heated cooling gas is directed over heat transfer surface 13 and split into two partial currents which are introduced into the cooling tank to gas feed devices 3 and 4 through respective gas flow channels 10 and 11. The cooling gas partial current fed through gas feed device 4 is further cooled by passing the same over the heat transfer surface 14. Heat transfer surfaces 13 and 14 are provided in parallel with each other.

The two cooling gas partial currents which flow through gas flow channels 10 and 11 are controlled by two separate blowers 16 and 17, respectively. The cooling tank 1 has an antechamber in the region of inlet 6. In this manner, the distance through which the cooling gas passes through the bulk material is maintained constant even when the bulk material is charged into the cooling tank in an intermittent manner.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In a method for cooling hot bulk material, such as glowing coke, clinker, or sinter material, comprising the steps of:

introducing the hot bulk material through an inlet into a vertically oriented cooling tank wherein it flows downwardly under gravity and is discharged from an outlet of the cooling tank;

feeding at least two partial currents of cooling gas into the cooling tank at respective feeding points therein, said feeding points being respectively arranged one over the other and so that the cooling gas flows upwardly in the tank around the material as the latter flows downwardly to cool the same with the cooling gas being simultaneously heated, the improvement comprising:

the cooling gas partial current fed into the cooling tank at a lower feeding point is at a lower temperature than the cooling gas partial current fed into the cooling tank at a feeding point which is arranged above said lower feeding point.

2. The method of claim 1 wherein the cooling gas fed into the cooling tank at a lower feeding point or points is heated as it flows upwardly in the cooling tank to a particular feeding point which is arranged above said lower point or points to a temperature which corresponds to the temperature of the cooling gas partial current fed into the cooling tank at said particular feeding point.

3. The method of claim 1 including the further steps of discharging the heated cooling gas from the upper region of the cooling tank, dividing the discharged cooling gas into said partial currents and directs said cooling gas partial currents into respective channels, recooling each of the cooling gas partial currents in its respective channel, and feeding the recooled cooling gas partial currents through said channels into the cooling tank at said respective feeding points.

4. The method of claim 3 wherein in at least one of said channels the heated cooling gas is directed to a heat exchanger having at least two heating surfaces arranged in series.

5. The method of claim 1 wherein the temperature difference between the bulk material and the cooling gas at substantially all levels of the cooling tank are substantially the same.

6. Apparatus for cooling hot bulk material, such as glowing coke, clinker, or sinter material, comprising:

a vertically oriented cooling tank having an upper inlet through which the material is introduced so as to flow downwardly under gravity and a lower outlet through which the material is discharged;

at least two gas feed means arranged over each other in said cooling tank for feeding respective partial currents of cooling gas into said cooling tank so that the cooling gas flows upwardly in the tank around the material as the latter flows downwardly to cool the same with the cooling gas being heated;

separate gas flow channels communicating with respective ones of said gas feed means for directing respective partial currents of cooling gas thereto;

gas discharge means arranged proximate to said upper inlet for discharging the cooling gas from said cooling tank; and recooling means situated in said gas flow channels for recooling the cooling gas partial currents fed into the cooling tank such that the cooling gas partial current fed into the cooling tank through a lower gas feed means is at a lower temperature than the cooling gas partial current fed into the cooling tank through a gas feed means arranged above said lower gas feed means.

7. The combination of claim 6 further including hot gas dust arrester means in fluid communication with said gas discharge means.

8. The combination of claim 6 wherein said recooling means comprises a heat recovery plant.

9. The combination of claim 8 wherein said heat recovery plant comprises a steam generating plant.

10. The combination of claim 9 wherein said steam generating plant includes at least one fluid circuit and associated heat transfer surfaces, said heat transfer surfaces being situated in at least one of said gas flow channels.

11. The combination of claim 10 wherein said heat transfer surfaces are situated in respective gas flow channels, and means for directing different amounts of cooling gas through the different gas flow channels, respectively.

12. The combination of claim 10 wherein said heat transfer surfaces include a superheater heating surface situated in one of said gas flow channels, and further including means located prior to one of said gas flow channels for moderating the temperature of the cooling gas being directed into the same.

13. The combination of claim 12 wherein said gas temperature moderating means comprise a heat accumulator.

14. The combination of claim 12 wherein said gas temperature moderating means comprise an adjustable cooling means.

15. The combination of claim 10 wherein said heat transfer surfaces are arranged in a parallel manner and are situated in respective ones of said gas flow channels and further including adjustable blowers located in respective gas flow channels for directing respective partial currents of cooling gas thereto to respective gas feed means.

16. The combination of claim 10 wherein heat transfer surfaces are arranged in series with each other and are situated in respective ones of said gas flow channels.

* * * * *